No. 776,192. Patented November 29, 1904.

UNITED STATES PATENT OFFICE.

ACHILLE MEYGRET, OF PARIS, FRANCE.

PROTECTIVE COATING OR COVERING FOR STORAGE-BATTERY PLATES.

SPECIFICATION forming part of Letters Patent No. 776,192, dated November 29, 1904.

Application filed June 29, 1903. Renewed April 6, 1904. Serial No. 201,914. (No specimens.)

*To all whom it may concern:*

Be it known that I, ACHILLE MEYGRET, a citizen of the Republic of France, residing at Paris, in the Department of the Seine, France, have invented a certain new and useful Improvement in Protective Coatings or Coverings for Storage-Battery Plates, of which the following is a specification.

One of the objections found in the use of storage-battery plates which are constructed with a grid and a facing of active matter or material applied to the grid is the loosening and continual dropping off or detachment of the material from the grid. This loosening and dropping off or detaching of the active material arises mainly from the repeated charging and discharging of the battery which causes the active matter to dilate and contract, and inasmuch as the elasticity of the active material is very limited the consequence is a loosening of the material which causes it to drop off or detach itself from the grid, rendering the battery useless, or at any rate impairing its efficiency. An increased thickness of plate, while to a certain extent overcoming the propensity of the loosening and continual dropping off of the active material from expansion and contraction, adds the objectionable feature of increase of weight to an excess and also an increase of size, both of which are undesirable and impracticable for certain uses and purposes.

The object of the present invention is to furnish a protective coating or covering to overlie the active material on the grid and retain such material on the grid against the effects of expansion and contraction of the active material by which the material becomes loosened and falls or detaches itself from the grid, and this without increasing the weight of the plate as a whole nor decreasing the active surface in connection with a thin plate and in no wise militating against the activity of the plate as a whole. The invention consists in the protective coating or covering applied to a storage-battery plate, as hereinafter described and claimed.

The protective coating or covering is a solution of tetra-acetate of cellulose or a solution of tetra-acetate of cellulose and tetrabutyrat of cellulose, either of which solutions can be used to make the protective coating or covering.

The plates or electrodes of a battery can be of any usual and well-known form of construction consisting of a grid and a filling of active material applied to the grid. The plate after the filling of active material has been applied thereto is to be dipped in the solution either of tetra-acetate of cellulose or the solution of tetra-acetate of cellulose and tetrabutyrat of cellulose for the solution to adhere to and form a coating or covering over the active material. This protective coating or covering forms, in effect, a sheath or film inclosing within it the active material, holding the material to the grid against the effects of expansion and contraction of the active material in charging and discharging the plate. The solution of tetra-acetate of cellulose, or the solution of tetra-acetate of cellulose and tetrabutyrat of cellulose, makes a sheath or film when applied to the plate that is elastic and at the same time impervious to the attacks of the electrolyte, thus furnishing what may be termed a "binding" that will prevent the active matter from becoming loosened and falling off or detaching itself from the plate. The sheath or envelop of either solution named being impervious to the attacks of the electrolyte, in order to have the electrolytic reactions of charging and discharging produced by the electrolyte operating on the active material provision must be made that will allow of the electrolyte reaching the active material without coming in direct contact with the metal of the grid, and for this purpose the envelop or sheath forming the protective coating or covering for the active material must be given or have a certain amount or degree of porosity, and the required porosity for the envelop or sheath can be given thereto either by passing the completed plate under a cylinder provided with fine needle-points that will perforate the outer envelop or sheath without destroying its continuity or by cutting a series of fine gashes in the envelop or sheath with a sharp blade or instrument furnishing a fine slit for the access of the electrolyte to the active material without presenting the metal of the grid to the direct contact of the electrolyte, or the porosity required for the envelop or sheath can be obtained chemically by mixing with the solution of tetra-acetate of cellulose or the solution of tetra-acetate of cellulose and tetrabutyrat of cellulose a powdered metal or a soluble salt, which by immersion of the plate in an acid-bath will cause the acid to eat out the metal or the salt and form holes at the places where the particles of metal or salt were located, which holes will permit of the electrolyte to reach the active material and keep the electrolyte from coming in direct contact with the metal of the grid.

This porous protective envelop or sheath is applicable to storage-battery plates or electrodes generally irrespective of the form or dimensions of the plate or electrode, and in use the plate or electrode, as to the metal grid, will be protected against the effects of the electrolyte, and at the same time the active material is open to the admission of the electrolyte thereto. The envelop or sheath, formed by dipping the filled plate in a solution of tetra-acetate of cellulose or a solution of tetra-acetate of cellulose and tetrabutyrat of cellulose, is elastic in nature and draws tightly over the active material and the grid, pressing the active material firmly against the supporting conductive grid and positively holding the active material in place on the grid, thereby preventing the active material from becoming loose or detaching itself from the grid or metal conductive plate, enabling a comparatively thin supporting and conductive grid or metal plate to be used with the active material applied thereto without the ill effects arising from the loosening of the active material and the dropping off thereof.

What I claim as new, and desire to secure by Letters Patent, is—

1. A protective coating or covering for storage-battery plates or electrodes, consisting of an envelop or sheath formed by dipping the plate or electrode with the active material thereon into a solution containing tetra-acetate of cellulose, substantially as described.

2. A protective coating or covering for storage-battery plates or electrodes, consisting of an envelop or sheath formed by dipping the plate or electrode with the active material thereon into a solution having tetra-acetate of cellulose as its base, substantially as described.

3. A protective coating or covering for storage-battery plates or electrodes, consisting of an envelop or sheath formed by dipping the plate or electrode with the active material thereon into a solution composed of tetra-acetate of cellulose and a solution of tetrabutyrat of cellulose mixed together, substantially as described.

ACHILLE MEYGRET.

Witnesses:
CHAS. H. WHITING,
WM. FALKINER.